Dec. 1, 1953                    R. F. McCAMMON                    2,660,899
                              MULTISPEED TRANSMISSION
                                Filed July 30, 1951
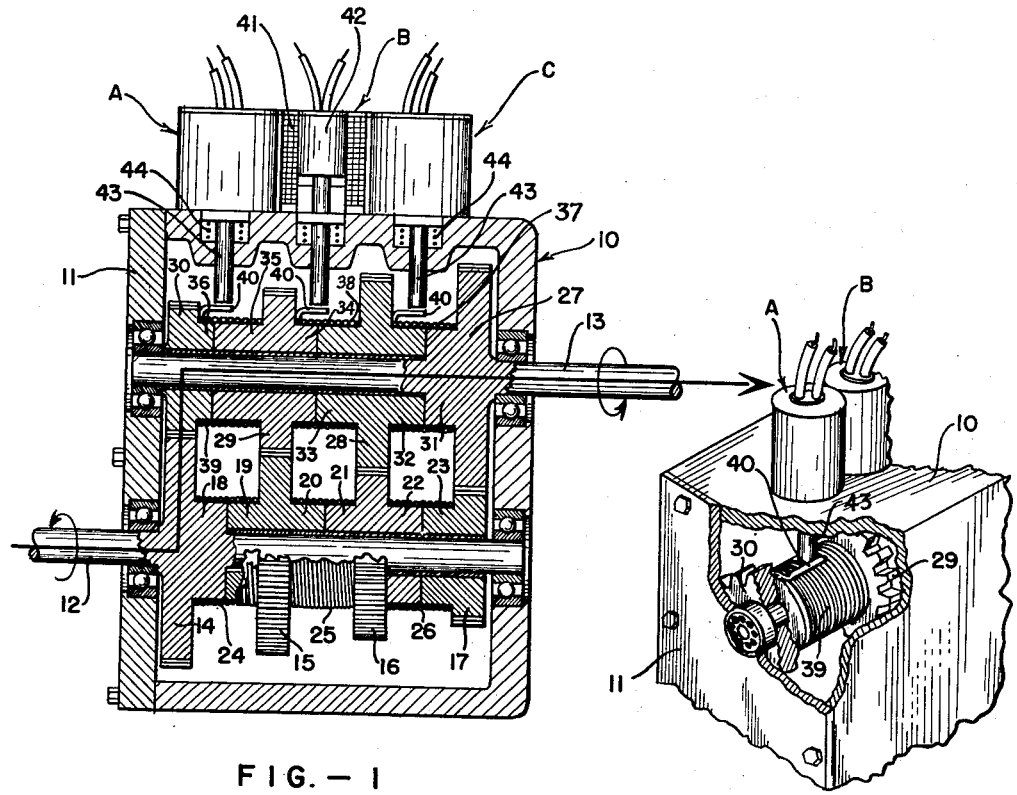
FIG.—1
FIG.—2
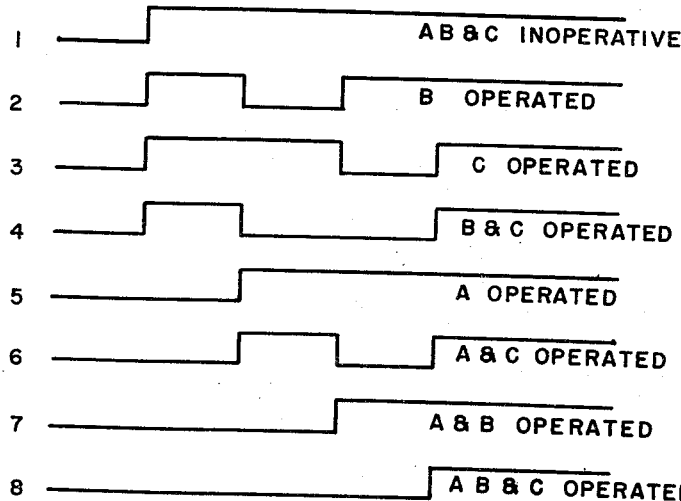
FIG. — 3
(Speed Ratios Available by Controling Soleonids)
INVENTOR.
Robert F. Mc Cammon
BY
ATTORNEYS Patented Dec. 1, 1953

2,660,899

UNITED STATES PATENT OFFICE 2,660,899

MULTISPEED TRANSMISSION

Robert F. McCammon, Denver, Colo., assignor to Heiland Research Corporation, Denver, Colo., a corporation of Colorado Application July 30, 1951, Serial No. 239,273

10 Claims. (Cl. 74—337)

This invention relates to gearing transmissions and more particularly to gearing structure whereby a plurality of speed ratios can be obtained between a drive and driven shaft.

One of the objects of the invention is to produce an improved change speed gearing in which a plurality of speed ratios can be obtained in an automatic manner, dependent upon the load imposed on the driven shaft.

A further object is to produce an improved change speed gearing in which companion gears remain in constant mesh and the various speed ratios are obtained by the functioning of clutches of the coil spring type.

Another object is to produce an improved change speed gearing in which speed ratios thereof can be obtained by controlling the functioning of clutches embodied therein by means which can be operated at will.

Still another object is to produce an improved change speed gearing having a plurality of speed ratios and wherein certain of said speed ratios may be caused to be automatically established in accordance with load on the driven shaft and other of said speed ratios may be established at the will of an operator.

Yet a further object is to produce a change speed gearing in which sets of gearing are in constant mesh and the speed ratios are obtained by the functioning of clutches of the coil spring type, some of which are controllable at will to establish certain speed ratios and others are capable of making driving connections automatically in accordance with load on the driven shaft to thereby establish other speed ratios.

A more specific object is to produce a change speed gearing embodying sets of gears and associated clutches of the coil spring type and so control at least some of the clutches by solenoid operated members as to thereby permit the establishment of a plurality of speed ratios.

A more specific object is to provide drive and driven shafts in parallel arrangement with companion constantly meshing gears and to associate with the gears on each shaft a clutch means of the coil spring type for connecting said gears to their shafts, together with control means for certain of said clutch means operable at will and thereby produce a change speed gearing in which certain speed ratios will be obtained automatically in accordance with the load on the driven shaft and other speed ratios will be obtained only at will.

Other objects of my invention will become apparent from the following description taken in connection with the accompanying drawings in which:

Figure 1 is a longitudinal sectional view through a change speed transmission having embodied therein my invention, said transmission being conditioned for automatic operation;

Figure 2 is a perspective view of the transmission with the casing broken away so the coil spring type of friction clutch employed therein can be seen; and Figure 3 is a view showing, by use of lines indicating paths of the flow of power, the eight possible speed ratios obtainable by controlling the solenoids.

Referring to the drawings in detail and first to Figures 1 and 2, the embodiment of the invention disclosed by way of example comprises a housing structure 10 provided with a removable front end wall 11. In the end walls are journaled in suitable bearings parallel arranged driving and driven shafts 12 and 13. At the forward end of the driving shaft 12, within the housing, is a large gear 14 fixed thereto by being integral, although it could, if desired, be a separate member and keyed to the shaft. Rotatably mounted on the driving shaft between the gear 14 and the rear end of the shaft are a plurality of gears 15, 16 and 17, said gears being of progressively reduced size, that is, diameter, from the gear 14, rearwardly. Gear 14, on its rear side, has a cylindrical hub 18; gear 15 has cylindrical hubs 19 and 20 on opposite sides thereof; gear 16 also has cylindrical hubs 21 and 22 on opposite sides thereof and the smallest gear 17 has a cylindrical hub 23 on its forward side. With these hubs, which are of like diameter, each gear has a hub on its side which is adjacent another gear.

The gears 15, 16 and 17 are all arranged to be connected by overrunning clutches to the driving shaft 12 and this is preferably accomplished by the hubs, together with coil springs. A coil spring 24 surrounds hubs 18 and 19 to connect gear 15 to the driving shaft through gear 14. Similarly a coil spring 25 surrounds hubs 20 and 21 to connect gear 16 to gear 15 and a coil spring 26 surrounds hubs 22 and 23 to connect gear 17 to gear 16. Considering that the drive shaft will be rotated in the direction of the arrow, the springs will be so wound on the hubs that they will be "wound up" to accomplish maximum gripping of the hubs and connect the gears together and to the driving shaft. The springs will have a normal diameter condition slightly less than that of the hubs so they will normally frictionally grip the hubs when mounted thereon. Power can be transmitted by the springs in one direction only. Thus, power can be transmitted to any of the gears from the driving shaft in its indicated direction of rotation. If gear 15 should be caused to rotate in the direction of the driving shaft (indicated by arrow on driving shaft), then coil spring 24 will be "unwound" and there will be no connection between gear 15 and the driving shaft. Gear 16 will not be connected to gear 15 when gear 16 rotates faster than gear 15, and similarly gear 17 will not be connected to gear 16 when gear 17 rotates faster than gear 16.

At the rear end of the driven shaft 13 within the housing, there is fixed thereto a large gear 27 which is shown integral with the shaft, but may be separate and keyed thereto if desired. This gear 27 is in constant mesh with gear 17 on the driving shaft. Driven shaft 13 also has rotatably mounted thereon stepped gears 28, 29 and 30 constantly meshing, respectively, with gears 16, 15 and 14 on the driving shaft. These gears are arranged to be connected with the driven shaft by coil spring type clutches similar to those associated with the gears on the driving shaft, but so constructed as to transmit different torque loads and to be controllable at will.

To provide for proper mounting and operation of these clutches for the gears on the driven shaft, gear 27 has a cylindrical hub 31 on the side toward gear 28. Gear 28 has cylindrical hubs 32 and 33 on opposite sides thereof; gear 29 has cylindrical hubs 34 and 35 on opposite sides thereof and gear 30 has a single cylindrical hub 36 on its side toward gear 29. The hubs are of uniform diameter. Mounted on adjacent hubs 31 and 32 is a coil spring 37; on adjacent hubs 33 and 34 is a coil spring 38 and on adjacent hubs 35 and 36 is a coil spring 39. Each spring is normally wound to have a somewhat smaller diameter than that of the hubs to thereby obtain a predetermined frictional gripping action. The direction of winding of each spring is such that a spring will "wind up" and more tightly grip its hubs when there is a winding in the direction of the arrow on the driven shaft. The direction of winding is opposite that for the coil springs for the gears on the driving shaft. Each coil spring 37, 38 and 39 has a turned over end 40, as shown, so as to control the gripping action and cause such to be either operative or inoperative.

The means shown for controlling the three coil springs 37, 38 and 39 are solenoids, but other structure can be employed if desired as, for example, direct manually operable mechanical structure. There are three solenoids mounted on top of the gearing housing. Solenoid A controls coil spring 39, solenoid B controls coil spring 38 and solenoid C controls coil spring 37. The solenoids are identical, each comprising an electrical coil 41, an armature 42 and plunger 43 for positioning ahead a turned over end 40 of a coiled spring. A spring 44 acts on a guide piston 45 on the plunger to normally hold the plunger out of the path of a spring end 40. When a solenoid is energized (by a switch and electrical power source not shown), the plunger will be moved downwardly so that its lower end will be in the path of rotation of a coil spring end. This will result in the end of the spring being held from turning and consequently, due to the direction of spring winding, the coil spring will become unwound and thereby release its gripping action on the hubs it surrounds and thus power cannot be transmitted by the coil spring.

In order that the gearing arrangement embodying my invention may automatically establish different speed ratios, depending on the load on the driven shaft, the coil spring clutches on the driven shaft are designed to transmit different maximum loads. When these loads are exceeded, slipping will take place. One simple way to accomplish this is to vary the lengths of hubs to be gripped by the various coil springs. This varies the areas gripped by the coil springs, which are of uniform size and construction. Other ways of varying the torque transmitted could be employed if desired. As shown in Figure 1, hub 36 on gear 30 is the shortest; hub 34 on gear 29 is slightly longer and hub 32 on gear 28 still longer. With this construction of the hubs, then the spring clutch connection between gears 30 and 29 will slip first as load increases on driven shaft 13. As load continues to increase, then the spring clutch connection between gears 29 and 28 will slip, and lastly the spring connection between gears 28 and the driven shaft will slip as the load on the shaft 13 still continues to increase. After all spring clutches 39, 38 and 37 are slipping, the driven shaft 13 will be driven from the driving shaft through gear set 27 and 17.

*Automatic operation*

When the improved change speed transmission is to operate in an automatic manner only, the three solenoids A, B and C will be de-energized and therefore inoperative, and the condition of the plungers will be as shown in Figure 1. Under such conditions the three coil springs 37, 38 and 39 associated with the gears on the driven shaft will be in normal gripping condition on the hubs of the various gears. Thus gear 30 will be connected to gear 29, the gear 29 to gear 28 and the gear 28 to the driven shaft through the gear 27. If the load on the driven shaft 13 is below the predetermined value necessary to cause the coil spring 39 to slip, the power being transmitted by the transmission will follow that path indicated by the power path line shown in Figure 1, that is, power will be transmitted from the driving shaft 12 through gear 14 to gear 30 and then through the various spring clutches associated with the gears on the driven shaft directly to the driven shaft. The speed ratio will be that as determined by the constantly meshing gears 14 and 30. Since the gears on the driven shaft are all connected together by coil spring clutches, these gears will be rotated and the gears on the driving shaft which are meshing therewith will also be rotated. However, these latter gears on the driving shaft will be caused to overrun the driving shaft, because each gear 15, 16 and 17 will be rotated at a faster rate of speed than the driving shaft, due to the gear ratios involved. Furthermore, gear 17 will be rotating faster than gear 16 and gear 16 will be rotating faster than gear 15. The result will be an unwinding action on each of the spring clutches 24, 25 and 26, thereby causing these spring clutches to act as overrunning clutches with no connection established.

If now the load on the driven shaft should become increased to such an extent that the spring clutch 39 slips on the hub 36 of gear 30, power will no longer be transmitted through gears 14 and 30, but will be transmitted through the gears 15 and 29 by spring clutch 24 becoming operative and this speed ratio will be lower than the previous speed ratio. While power is being transmitted through the gears 15 and 29, the coil springs 25 and 26 will be acting as overrunning clutches and thus not effective, all due to the fact that the gears 16 and 17 are rotating faster than the driving shaft, as is believed to be already apparent from the described manner in which these same gears were rotating faster than the driving shaft when power was being transmitted through the gears 14 and 30.

If there should be still a further increase in load on the driven shaft and to such an extent that the coil spring clutch 38 begins to slip on the hub 34 of gear 29, then power will begin to be transmitted through the meshing gears 16 and 28 and at a lower speed ratio than the previous speed ratio of the gears 15 and 29. The gear 17 will continue to overrun the driving shaft. During transmission of power through the gears 16 and 28, both spring clutches 24 and 25 will be effective to produce a driving connection between the gear 16 and the driving shaft.

When the load on the driven shaft further increases and to a sufficient amount to cause the coil spring clutch 37 to slip on the hub 32 of gear 28, power will then be transmitted through the lowest speed ratio of the disclosed transmission which comprises the meshing gears 17 and 27. The gear 17 will be driven from the driving shaft through all three of the coil spring clutches 24, 25 and 26. The gears 28, 29 and 30 on the driven shaft will all be slipping with respect to the coil spring clutches 37, 38 and 39. The gripping action of the coil springs associated with the gears on the driving shaft will then determine the maximum load transmittable by the transmission.

From the foregoing description it will be seen that without operation of any of the solenoids there will be available in the disclosed transmission four speed ratios. The speed ratio which will be effective will depend upon the load on the driven shaft. As the load increases, the speed ratio will decrease, thus creating a greater leverage to take care of the increased load.

*Manual operation*

When it is desired to manually control the disclosed transmission, eight speed ratios will be available to the operator and these can be established by variously energizing the three solenoids A, B and C. If none of the solenoids are operated, then there will be available to the operator the speed ratio of the transmission which is indicated by the power path line in Figure 1 and already described in connection with the automatic operation. This power path line is also indicated in Figure 3 by line No. 1. The other seven speed ratios are represented in Figure 3 by the power path lines 2 to 8. These power path lines are all placed directly below the sectional view of the transmission shown in Figure 1 and the arrangement is intended to be such that the flow of power can be traced through the various groups of meshed gears, since the vertical lines directly below each set of gears is an indication that power is being transmitted through these gears.

If the solenoid B should be energized, the coil spring clutch 38 would then become inoperative. The result will be that power is transmitted from the driving shaft through the meshing gears 14 and 30 and then to the gear 29 through the coil spring clutch 39. The power path line is shown by No. 2 of Figure 3. Since the gear 29 is no longer connected directly to the driven shaft because of the inoperative condition of spring clutch 38, gear 29 cannot directly rotate the driven shaft or the gears 28 and 16. Thus, coil spring 25 will become effective to connect the gear 15 to the gear 16 on the driving shaft and, therefore, power will be transmitted from gear 29 to gear 15 and then to gear 16. Gear 28 on the driven shaft which constantly meshes with the gear 16 will then transmit power to the driven shaft, due to the operative condition of the coil spring 37. Gear 17 will be rotating at a greater speed than the gear 16 on the driving shaft and consequently the coil spring 26 will be unwound and gear 17 will overrun. Gear 15 will also overrun gear 14.

If only solenoid C should be operated, then power will flow by the No. 3 power path line in Figure 3. Since coil spring 37 is now caused to be inoperative by the energizing of the solenoid C, power cannot be transmitted from the gear 28 directly to gear 27 and the driven shaft and, consequently, the power will be transmitted from the gear 28 to the gear 16 on the driving shaft and then through the coil spring 26 to gear 17 on the driving shaft, which will then operate the driven shaft because of its meshed condition with the gear 27. Spring clutches 24 and 25 will be ineffective and permit overrunning of gears 15 and 16.

If solenoids B and C should both be operated, then spring clutches 38 and 37 will both be caused to be inoperative and the flow of power will be in accordance with the power path line No. 4 in Figure 3. In other words, the power will be transmitted through the gears 14 and 30 through the inoperative coil spring 39 and then through the constantly meshed gears 29 and 15, through the coil springs 26 and 27 and lastly through the gears 17 and 27 to the driven shaft. Gear 15 will overrun gear 14.

If the solenoid A only should be energized to cause coil spring 39 to be inoperative, flow of power through the transmission will be in accordance with the power path line No. 5 in Figure 3. This power path will be from the driving shaft to the constantly meshing gears 15 and 29 and then to the driven shaft through the operative coil spring clutches 38 and 37. Gears 16 and 17 on the driving shaft will overrun because they are being driven at a greater speed than the speed of gear 15.

If solenoids A and C should both be operated, the flow of power through the transmission will be in accordance with the power path line No. 6 in Figure 3. Power will be transmitted from the driving shaft to the gears 15 and 29 and then from gear 29 through the operative coil spring 38 to the gear 28 and from this gear to the gear 16 on the driving shaft and then through the coil spring 26 and to the driven shaft by way of the meshed gears 17 and 27. During this established speed ratio, gear 30 will be rotating freely on the driven shaft, due to the inoperative condition of the coil spring 39 and gear 16 will overrun gear 15.

If solenoids A and B should both be energized, the flow of power will be through the transmission in accordance with that indicated by the flow of power path line No. 7 in Figure 3. Power will be transmitted from the driving shaft to the driven shaft only through the gears 16 and 28. Gear 17 will overrun on the driving shaft and gears 30 and 29 will be rotating freely on the driven shaft, due to the inoperative condition of the coil spring clutches 39 and 38.

When all three of the solenoids A, B and C are energized, the flow of power will be transmitted from the drive shaft to the driven shaft through the gears 17 and 27, as indicated by power path line No. 8 in Figure 3. The three gears 30, 29 and 28 will all be freely rotating on the driven shaft, due to the inoperative condition of the coil spring clutches 39, 38 and 37. The path of power through the transmission will be the same as when the maximum load is on the driven shaft and the transmission is set in automatic, that is, with all solenoids A, B and C inoperative, since the coil springs 39, 38 and 37 are made positively inoperative instead of being inoperative due to slipping.

*Semi-automatic operation*

In addition to the full manual control and automatic operations already described, there is a semi-automatic operation for the transmission which is believed to be obvious from the description of the automatic and full manual operations. The semi-automatic operation is available by operating solenoid A alone, or solenoids A and B simultaneously. When A is operated only, a flow of power will be as indicated by the power path line No. 5 in Figure 3 as long as the load is below a predetermined value, as determined by the slipping load of coil spring 38. However, if the load should increase above this predetermined value, then power will be transmitted automatically from the driving shaft to the driven shaft through companion meshing gears 16 and 26. If further load should be placed upon the driven shaft and of such value as to cause the coil spring 37 to also slip, then power will be transmitted through the companion meshing gears 17 and 27. These conditions are the same as already described in the automatic operation.

Whenever both solenoids A and B are operated, the flow of power will be through the gears 16 and 26, as indicated by the power path line No. 7 in Figure 3. This ratio will prevail as long as the load on the driven shaft is insufficient to cause slipping of the coil spring 37. However, when slippage occurs, due to increase in load, then power will be automatically transmitted through the meshing gears 17 and 27 in a manner already described in connection with the automatic operation.

In the event all three solenoids should be operated simultaneously, the speed ratio of course would be in accordance with the power path indicated by power path line 8 of Figure 3 and already described in connection with the manual operation of the transmission.

From the foregoing description it is seen that I have constructed a change speed transmission which is very flexible and will permit many speed ratios to be obtained, either with an automatic, manual or semi-automatic manner of operation and by the use of only eight gears on the driving and driven shafts and a special arrangement and operation of clutches of the coil spring type. Although the overrunning clutches are shown as of the coil spring type, other types of overrunning clutches can be employed, if desired. It is believed to be obvious that more or fewer speed ratios can be obtained than those shown by adding or eliminating companion gear sets. If any reverse speed ratio is desired, it is believed to be obvious that such can be obtained by inserting an idler gear between gears on the driving and driven shafts and so arranging the coil spring clutches that they will be effective to perform a driving connection for the direction of rotation of the gears involved. The transmission can be adapted for any use where desired to transmit power at different speed ratios. It is especially useful where the transmission is desired to be small and many speed ratios are desired to be available. It also can be used in automobiles and other places by proper design. Changes in speed ratios can be made effective when wanted by proper design of the clutches to perform their slipping action. Besides controlling at will the coil springs for the gears on the driven shaft, the coil springs for the gears on the driving shaft can also be adapted to be controlled at will as, for example, by providing them with the turned out ends for engagement with solenoid plungers. Therefore, being aware of the possibility of modifications in the particular transmission arrangement shown, all without departing from the fundamental principles of my invention, I desire it to be understood that the scope of the invention is not to be limited in any manner except in accordance with the appended claims.

What is claimed is:

1. In a variable speed gearing arrangement, parallel drive and driven shafts, companion meshing gears on the drive and driven shafts having different ratios, means including overrunning clutches for connecting the gears on the driving shaft thereto, and means including friction clutches for connecting the gears on the driven shaft thereto, said friction clutches each being of the type capable of slipping when a load greater than a predetermined value is to be transmitted and each slipping at a different value.

2. In a variable speed gearing arrangement, parallel drive and driven shafts, companion meshing gears on the drive and driven shafts having different ratios, means including overrunning clutches for connecting the gears on the driving shaft thereto, means including friction clutches for connecting the gears on the driven shaft thereto, said friction clutches each being of the type capable of slipping when a load greater than a predetermined value is to be transmitted and each slipping at a different value, and means for disabling each friction clutch at will.

3. In a variable speed gearing arrangement, a driven shaft, gears loosely mounted on said shaft, means for driving the gears at different speed ratios, and friction clutch means for connecting the gears to the driven shaft and each being capable of slipping when a predetermined load is transmitted, each clutch comprising a hub of equal diameter on a gear and a coil spring of one diameter having one end operatively connected with the driven shaft and coils at the other ends surrounding a hub, the coils which surround the hubs being different in number with respect to each clutch to thereby have the clutches transmit different loads before slippage takes place.

4. In a variable speed gearing arrangement, parallel drive and driven shafts, sets of meshing gears on the shafts with the gears on the driving shaft successively decreasing in diameter and the companion gears on the driven shaft increasing in diameter, a one-way drive connection between the driving shaft and the gears thereon whereby the shaft can drive the gears but the gears cannot drive the shaft, and friction clutch means connecting the gears on the driven shaft together and also operatively connecting the gears to the said shaft, said friction clutches being of the type that will slip when a load being transmitted reaches a predetermined value, the said friction clutches slipping at progressively greater loads from the smaller gear to the shaft.

5. In a variable speed gearing arrangement, parallel drive and driven shafts, sets of meshing gears on the shafts with the gears on the driving shaft successively decreasing in diameter and the companion gears on the drive shaft increasing in diameter, a one-way drive connection between the driving shaft and the gears thereon whereby the shaft can drive the gears but the gears cannot drive the shaft, and friction clutch means connecting the gears on the driven shaft together and also operatively connecting said gears to the said shaft, said friction clutches being of the coil spring type and being mounted on hubs extending from adjacent gears, the coil springs being capable of slipping at progressively greater loads from the smaller gear to the shaft.

6. In a variable speed gearing arrangement, parallel drive and driven shafts, sets of meshing gears on the shafts with the gears on the driving shaft successively decreasing in diameter and the companion gears on the drive shaft increasing in diameter, a one-way drive connection between the driving shaft and the gears thereon whereby the shaft can drive the gears but the gears cannot drive the shaft, and friction clutch means connecting the gears on the driven shaft together and also operatively connecting said gears to the said shaft, said friction clutches being of the type that will slip when a load being transmitted reaches a predetermined value, said friction clutches slipping at progressively greater loads from the smaller gear to the shaft, and means for disabling each friction clutch at will.

7. In a variable speed gearing arrangement, a drive shaft, a parallel driven shaft, a gear fixed to the drive shaft, other gears of decreasing diameter loosely mounted on the drive shaft, a gear fixed to the driven shaft and meshing with the smallest gear on the driving shaft, other gears loosely mounted on the driven shaft and meshing with gears on the driving shaft including the fixed gear thereon, cylindrical hubs extending from the sides of the gears, there being a hub for each side of a gear which is toward an adjacent gear, a clutch of the coil spring type surrounding each pair of adjacent hubs, the springs on the hubs of the gears on one shaft being wound opposite those on the other shaft, and means for selectively controlling the clutches associated with the gears on one of the shafts so that such may be made operative or inoperative.

8. In a variable speed gearing arrangement, a drive shaft, a parallel driven shaft, a gear fixed to the drive shaft, other gears of decreasing diameter loosely mounted on the drive shaft, a gear fixed to the driven shaft and meshing with the smallest gear on the driving shaft, other gears loosely mounted on the driven shaft and meshing with gears on the driving shaft including the fixed gear thereon, cylindrical hubs extending from the sides of the gears, there being a hub for each side of a gear which is toward an adjacent gear, and a clutch of the coil spring type surrounding each pair of adjacent hubs, the springs on the hubs of the gears on the driven shaft being wound opposite those on the drive shaft, and the hubs of the gears on the driven shaft with which the said coil springs cooperate being of varying lengths in order that each spring clutch will transmit a different maximum load before slipping.

9. In a variable speed gearing arrangement, a drive shaft, a parallel driven shaft, a gear fixed to the drive shaft, other gears of decreasing diameter loosely mounted on the drive shaft, a gear fixed to the driven shaft and meshing with the smallest gear on the driving shaft, other gears loosely mounted on the driven shaft and meshing with gears on the driving shaft including the fixed gear thereon, cylindrical hubs extending from the sides of the gears, there being a hub for each side of a gear which is toward an adjacent gear, a clutch of the coil spring type surrounding each pair of adjacent hubs, the springs on the hubs of the gears on one shaft being wound opposite those on the other shaft, and means operable at will for engaging the ends of the coil spring clutches associated with the hubs of the gears on the driven shaft and causing said clutches to be in either gripping or non-gripping condition.

10. In a variable speed gearing arrangement, a drive shaft, a parallel driven shaft, a gear fixed to the drive shaft, other gears of decreasing diameter loosely mounted on the drive shaft, a gear fixed to the driven shaft and meshing with the smallest gear on the driving shaft, other gears loosely mounted on the driven shaft and meshing with gears on the driving shaft including the fixed gear thereon, cylindrical hubs extending from the sides of the gears, there being a hub for each side of a gear which is toward an adjacent gear, a clutch of the coil spring type surrounding each pair of adjacent hubs, the springs on the hubs of the gears on the driven shaft being wound opposite those on the drive shaft, and the hubs of the gears on the driven shaft with which the said coil springs cooperate being of varying lengths in order that each spring clutch will transmit a different maximum load before slipping, and means for causing the spring clutches on the driven shaft to be selectively inoperative at will.

ROBERT F. McCAMMON.

References Cited in the file of this patent

UNITED STATES PATENTS

| Number | Name | Date |
| --- | --- | --- |
| 799,088 | Prentice | Sept. 12, 1905 |
| 1,974,267 | Galloway | Sept. 18, 1934 |

FOREIGN PATENTS

| Number | Country | Date |
| --- | --- | --- |
| 465,018 | Great Britain | Apr. 29, 1937 |